US011398729B1

(12) United States Patent
Upreti et al.

(10) Patent No.: US 11,398,729 B1
(45) Date of Patent: Jul. 26, 2022

(54) ADAPTIVE LOAD MANAGEMENT BASED ON SYSTEM CAPACITY IN A MICROGRID ENVIRONMENT

(71) Applicant: Schweitzer Engineering Laboratories, Inc., Pullman, WA (US)

(72) Inventors: Ashish Upreti, Pullman, WA (US); Ashok Balasubramanian, Eagle, ID (US); Tyler Loyd McCoy, Spokane Valley, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/316,947

(22) Filed: May 11, 2021

(51) Int. Cl.
*H02J 3/14* (2006.01)
*H02J 7/00* (2006.01)

(52) U.S. Cl.
CPC ............ *H02J 3/144* (2020.01); *H02J 7/0048* (2020.01); *H02J 7/0063* (2013.01)

(58) Field of Classification Search
CPC ........ H02J 3/144; H02J 7/0048; H02J 7/0063; H02J 3/472; H02J 3/38; H02J 3/381; H02J 3/46; H02J 3/004; G05B 17/02
See application file for complete search history.

(56) References Cited

U.S. PATENT DOCUMENTS

| | | | |
|---|---|---|---|
| 8,965,592 | B2 | 2/2015 | Manson |
| 9,008,850 | B2 | 4/2015 | Manson |
| 9,519,301 | B2 | 12/2016 | Bartlett |
| 9,568,516 | B2 | 2/2017 | Gubba Ravikumar |
| 9,733,623 | B2 | 8/2017 | Yang |
| 10,310,480 | B2 | 6/2019 | Manson |
| 10,381,835 | B1* | 8/2019 | Gubba Ravikumar ...................... G05B 17/02 |
| 10,644,493 | B2 | 5/2020 | Gubba Ravikumar |
| 10,739,414 | B2 | 8/2020 | Gubba Ravikumar |
| 10,992,133 | B1 | 4/2021 | Upreti |

(Continued)

OTHER PUBLICATIONS

Zima, Marek; Larsson, Mats; Korba, Petr; Rehtanz, Christian; Andersson, Goran: "Design Aspects for Wide-Area Monitoring and Control Systems" Proceedings of the IEEE, vol. 93, No. 5, May 2005.

(Continued)

*Primary Examiner* — Lincoln D Donovan
*Assistant Examiner* — Alex W Lam
(74) *Attorney, Agent, or Firm* — Stoel Rives LLP; Richard M. Edge (57) ABSTRACT

System, methods, and techniques for load management in a microgrid are disclosed. A system of load management includes one or more processors configured to receive a time threshold value defining a time period of power demand in a microgrid, determine a battery rating of the microgrid, and trigger load shedding or load restoration in the microgrid based on one or more of the time threshold value and the battery rating. The load shedding includes selecting and shedding a first load in the microgrid for load shedding, thereby removing a measured power consumption of the selected first load from an overall power consumption of the microgrid by the shedding. The load restoration includes selecting and restoring the first load in the microgrid, there by adding the measured power consumption of the selected first load to an overall power consumption of the microgrid by restoration.

20 Claims, 5 Drawing Sheets

(56) References Cited

U.S. PATENT DOCUMENTS

| | | | |
|---|---|---|---|
| 11,177,657 B1* | 11/2021 | Khatib | ............ H02J 3/46 |
| 2004/0252525 A1 | 12/2004 | Aldridge | |
| 2007/0100504 A1 | 5/2007 | Moxley | |
| 2009/0254655 A1 | 10/2009 | Kidwell | |
| 2011/0004324 A1 | 1/2011 | Bickel | |
| 2012/0226386 A1 | 9/2012 | Kalathu | |
| 2015/0222123 A1* | 8/2015 | Manson | ...... H02J 13/00017 |
| | | | 700/287 |

OTHER PUBLICATIONS

Larsson, Mats; Regtanz, Christian: "Predictive Frequency Stability Control Based on Wide-Area Phasor Measurements" IEEE, 2002.
Walling, R.A.; Miller, N.W.: "Distributed Generation Islanding—Implications on Power System Dynamic Performance" IEEE 2002.
Hu, Dongchen; Venkatasubramanian, Vaithianathan: "New Wide-Area Algorithms for Detection and Mitigation of Angle Instability Using Synchrophasors" IEEE 2007.

* cited by examiner

ADAPTIVE LOAD MANAGEMENT BASED ON SYSTEM CAPACITY IN A MICROGRID ENVIRONMENT

TECHNICAL FIELD

The present disclosure relates to load management techniques, and more particularly to systems and methods for adaptive load management based on system capacity in a microgrid environment.

BRIEF DESCRIPTION OF THE DRAWINGS

Non-limiting and non-exhaustive embodiments of the disclosure are described herein, including various embodiments of the disclosure with reference to the figures listed below.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

The phrases "coupled to," "connected to," and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. In addition, the terms "comprising" and "including" are open ended and even may allow for the inclusion of elements similar to recited elements but having different characteristics and/or configurations.

A modern electric power system (sometimes herein "power system") may incorporate a variety of control, monitoring, and/or communication technologies and devices that may be used to control, monitor, automate, and communicate information, for example, to protect the power system.

Communication equipment coupled to and/or integrated with the devices may be configured to form one or more communication networks that can be utilized to facilitate an exchange of data among a variety of devices that monitor conditions and/or control actions on the power system to maintain the stability of the power system. The communication network(s) can send messages that carry information for a proper assessment of power system conditions and for implementing control actions based on such conditions. The potential for rapid changes in conditions of a power system results in constraints on the messages sent by a communication network (e.g., time constraints).

In some embodiments, the communication network(s) may include software defined network ("SDN") technologies that may include a controller that regulates communications on the network. SDN technologies offer a variety of features that can be advantageous for use with power systems (e.g., deny-by-default security, latency guarantees, deterministic transport capabilities, network agility, redundancy and fail over planning, etc.).

Electric power generation and delivery systems are designed to generate, transmit, and distribute electrical energy to loads. Electric power generation and delivery systems may include equipment such as: electrical generators, electrical motors, power transformers, power transmission and distribution lines, circuit breakers, switches, busses, voltage regulators, capacitor banks, and the like. Such equipment may be monitored, controlled, automated, and/or protected using one or more intelligent electronic devices (IEDs) that may receive electric power delivery system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, bay controllers, meters, recloser controls, governors, exciters, statcom controllers, static VAR compensator (SVC) controllers, on-load tap changer (OLTC) controllers, and the like. Further, in some embodiments, IEDs may be communicatively connected via a data transmission network that includes, for example, multiplexers, routers, hubs, gateways, firewalls, and/or switches to facilitate communications on the network. Networking and communication devices may also be integrated into an IED and/or be in communication with an IED. As used herein, the term IED may refer to a single discrete IED or to a system of multiple IEDs operating together.

Moreover, as used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, PAL, PLA, PLD, CPLD, FPGA, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated alternating current (AC) power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Microgrid controls may be designed to maximize generation availability, preserve critical loads, and/or ensure system stability. Microgrids may also be capable of autonomous operation during a loss of utility or intentional islanding during grid disturbances. Such autonomous operation may require sources that can provide primary frequency and voltage regulation within the microgrid system. Additional controls may also use one or more optimization algorithms for saving costs, improving efficiency, and/or maximizing green energy usage.

Some embodiments of the present disclosure relate to a novel load management technique. In some embodiments, the technique uses available system capacity. In some embodiments, a microgrid controller reviews one or more available assets in the given system and, based on the available capacity (e.g., battery state of charge (SOC), fuel availability for generators, solar irradiance and/or wind forecast (based on system topology)), dispatches the loads either to shed or close according to a user settable time threshold.

Figure 1:
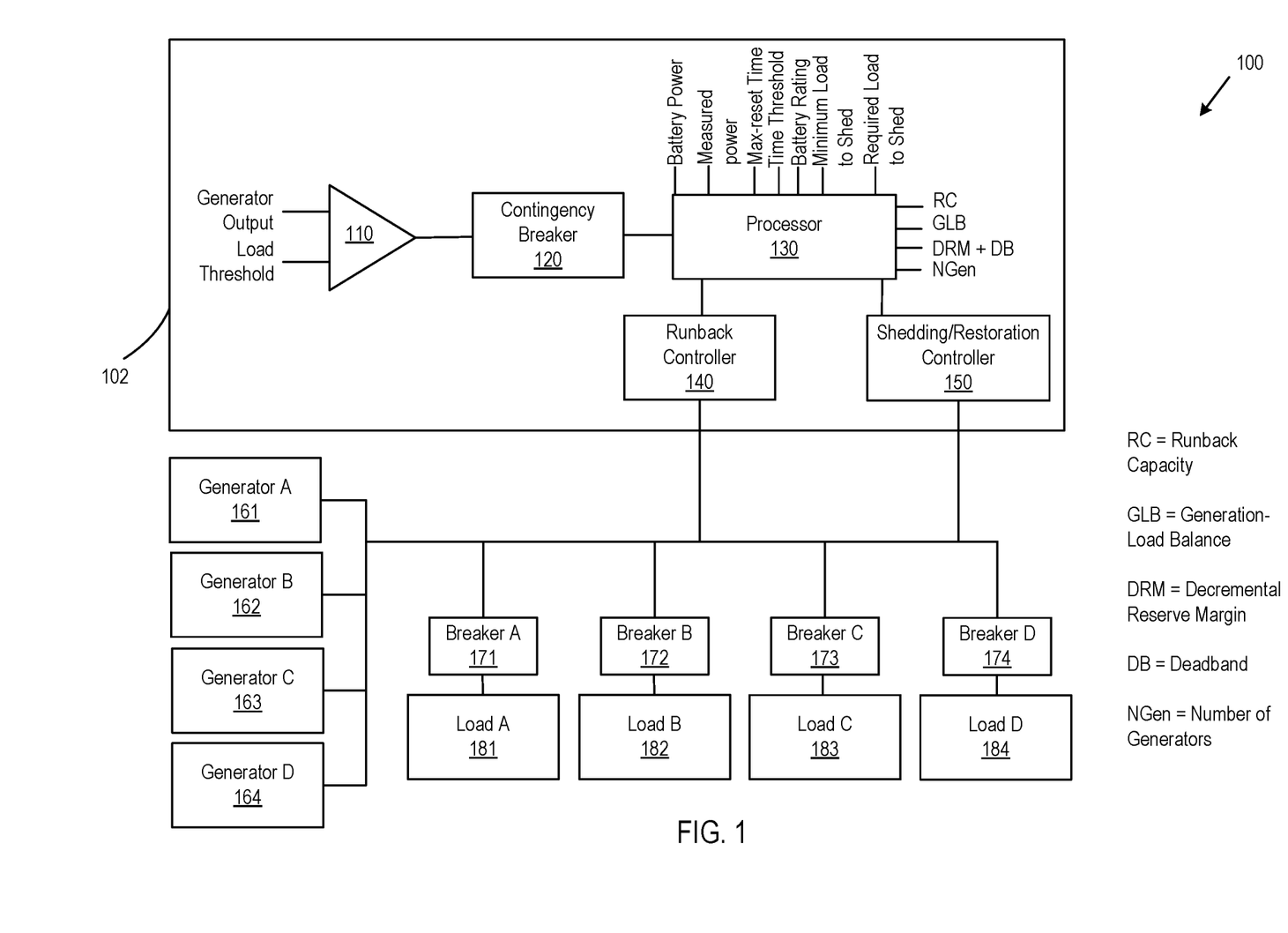
FIG. 1 is a simplified diagram of an electric power system that includes an intelligent electronic device (IED) for load shedding and restoration, according to some embodiments of the present disclosure.

FIG. 1 is a simplified diagram of one embodiment of a power system 100 that includes an IED 102, generators 161, 162, 163, 164, breakers 171, 172, 173, 174, and loads 181, 182, 183, 184. The power system 100 may be within or comprise a microgrid, which may at times be disconnected or otherwise isolated from a utility power grid. In a power system (such as the power system 100 of FIG. 1), balancing generated power with a load threshold or load demand is desirable in order to avoid disruptions in delivery of power. It is therefore desirable to either increase the load or decrease the generated power if the generated power is greater than the load threshold. It is also therefore desirable to either shed load or increase the generated power if the generated power is less than the load threshold. The power system 100 may decrease load threshold by shedding one or more loads 181-184, and may increase load threshold by restoring previously shed loads 181-184. The power system 100 may decrease the generated power by shedding and/or running back one or more of the generators 161-164, and may increase the generated power by closing one or more of the generators 161-164.

According to one embodiment, the IED 102 of the power system 100 may comprise a comparator 110, a contingency breaker 120, a processor 130, a runback controller 140, and a shedding/restoration controller 150. The IED 102 may be coupled to the generators 161-164 and breakers 171-174 of the power system 100 by coupling the runback controller 140 and/or the shedding/restoration controller 150 to the generators 161-164 and to the breakers 171-174.

According to FIG. 1, the breakers 171-174 may couple or de-couple the generators 161-164 to the loads 181-184. Specifically, the breakers 171-174 allow power from the generators 161-164 to be delivered to the loads 181-184 if the breakers 171-174 are closed, and do not allow power to be delivered to the loads 181-184 if the breakers 171-174 are opened. The breakers 171-174 may be controlled independently or collectively by the shedding/restoration controller 150 of the IED 102.

The generators 161-164 may comprise any of a variety of sources of power generation, including but not limited to a utility grid generator, a battery or other storage device, photovoltaic array, a wind turbine generator, a fuel cell, etc. One or more of the generators 161-164 may have a runback capability, where the frequency at which the generators 161-164 operate may be controlled by the runback controller 140 of the IED 102. For example, if a first generator 161 is operating at 150 MW and the runback controller 140 sends a command to the first generator 161 to decrease the output to 120 MW, the first generator 161 may respond to the runback request by decreasing the frequency of operation until the desired output is reached. The generators 161-164 may be controlled independently by the runback controller 140 of the IED 102.

The processor 130 of the IED 102 may send commands to the runback controller 140 and/or the shedding controller 150 after determining an appropriate action for appropriately balancing the load and the power generation. According to FIG. 1, the processor 130 receives inputs that may include a signal from the contingency breaker 120, battery power (e.g., Total BESS state of charge and/or individual battery power), measured power in a system, max-reset time, time threshold, battery (MW) rating, minimum load (MW) to shed in the system, required load to shed, the runback capacity (RC) of the generators 161-164, the generation-load balance (GLB) on the power system 100, the number of generators (NGen), and the sum of the decremental reserve margin (DRM) and deadband (DB). The DRM may be defined as the ability of the generators 161-164 to reject a load within a given frequency limit, and the DB may be used to create an allowed over-shed in order to reduce the number of generators shed.

The comparator 110 of the IED 102 may receive input indicating the generator output (or generator power production) and receive input indicating the load threshold or, in another example, an upper load threshold and a lower load threshold. The comparator 110 may determine if the generator output has a smaller magnitude than the load threshold (or less than a lower threshold). If the magnitude of the generator output is less than the load threshold (or less than a lower threshold), the comparator 110 may send a signal to the contingency breaker 120 to allow the processor 130 to perform programmed computations and send commands to the runback controller 140 and shedding controller 150. Further, the comparator 110 may determine if the generator output has a greater magnitude than the load threshold (or greater than an upper threshold). If the magnitude of the generator output is greater than the load threshold (or greater than an upper threshold), the comparator 110 may send a signal to the contingency breaker 120 to allow the processor 130 to perform programmed computations and send commands to the runback controller 140 and shedding controller 150. According to various embodiments, the comparator 110 may pass an analog or digital signal or series of signals and/or outputs to the contingency breaker 120 or directly to the processor 130.

In one example, the comparator 110 is a differentiator, and the output of the comparator 110 is the GLB (the difference between the generator output and the load threshold indicating either excess generation or under generation). According to the example, the contingency breaker 120 can receive the GLB from the comparator 110, and determines if the GLB indicates load shedding may be performed (e.g., the GLB indicates under generation) According to the example, the contingency breaker 120 can receive the GLB from the comparator 110, and determines if the GLB indicates load restoration, generator shedding, or generator runback may be performed (e.g., the GLB indicates over generation). The contingency breaker 120 may determine if the GLB indicates under or over generation by comparing the GLB to a value defined by the user(s) or the power system 100. If the magnitude of the GLB is sufficiently large (e.g., over an upper threshold, indicating excess generation and load restoration may be performed), the contingency breaker 120 may close, and the GLB may pass to the processor 130. Upon receiving the GLB, the processor 130 may perform programmed computations and send commands to the runback controller 140 and/or shedding/restoration controller 150 to reduce generation as appropriate or restore load(s) as appropriate to stabilize the power system 100. In another example, if the magnitude of the GLB is sufficiently negative (e.g., below a lower threshold, indicating under generation and load shedding may need to be performed), the contingency breaker may close and the GLB may pass to the processor 130. Upon receiving the GLB, the processor 130 may perform programmed computations and send commands to the shedding/restoration controller 150 to shed one or more loads 181-184.

In another example, the GLB is determined independently of the comparator 110. According to the example, the comparator 110 may compare the generator output to the load threshold, and output a binary value/command directly to the processor 130. If the generator output is greater than the load threshold, the binary value may be a command for the processor 130 to perform programmed computations and send commands to the runback controller 140 and shedding/restoration controller 150. If the generator output is less than the load threshold, the binary value may be a command for the processor 130 to perform programmed computations and send commands to the shedding/restoration controller 150. Alternatively, the comparator 110 may pass a binary value to the contingency breaker 120, and the contingency breaker 120 may receive the GLB from a source other than the comparator 110. The binary value may be a command to allow the contingency breaker 120 to compare the GLB to a value defined by the user(s) or the power system 100. If the contingency breaker 120 determines that the EG is sufficiently beyond an upper threshold (or below a lower threshold if negative; e.g. a dearth of generation, or under generation), the contingency breaker may pass the GLB to the processor 130 along with a command to perform programmed computations and send commands to the runback controller 140 and/or shedding controller 150.

The processor 130 may determine whether to shed or close one or more loads 181-184 (and/or to shed generators 161-164 or runback generators 161-164) and/or perform a combination thereof. Further, the processor 130 may determine how many loads 181-184 (and/or generators 161-164) to shed or close (restore), or how much runback is desirable.

In one embodiment, the shedding controller 150 determines which generators 161-164 to shed. In another embodiment, the shedding controller 150 determines which loads 181-184 to shed or close. In an alternative embodiment, the processor 130 determines which generators 161-164 to shed or which loads 181-184 to shed or close, and the shedding/restoration controller 150 manipulates the signals from the processor 130 such that the signals can trip selected breakers 171-174. In one embodiment, the runback controller 140 determines which generators 161-164 to runback as well as the amount that each is runback. In an alternative embodiment, the processor 130 determines which generators 161-164 to runback as well as the amount that each is runback, and the runback controller 140 manipulates the signals from the processor 130 such that the signals can control the frequency at which the generators 161-164 operate.

The shedding/restoration controller 150 may control the breakers 171-174, such that one or multiple loads 181-184 may be shed (de-coupled from the generators 161-164) at a time. For example, each load may draw a current of 100 MW, where the total load on the system is 400 MW. The processor 130 of the IED 102 may request that 200 MW be shed, and the shedding/restoration controller 150 may send a shed command for the first two breakers 171, 172 to de-couple the first two loads 181, 182, thereby shedding 200 MW.

Another possibility is that the processor 130 may request that one or multiple loads 181-184 be restored (e.g., re-coupled to generators 161-164 after being shed or otherwise offline). For example, load 181 and load 182 may each draw a current of 100 MW, while loads 183 and 184 may have previously been shed from the system (e.g., de-coupled from the generators 161-164) and the total load of the system is 200 MW. The processor 130 of the IED 102 may request that 200 MW be restored to the system, and the shedding/restoration controller 150 may send a restoration command to breakers 173 and 174, coupling the loads 183 and 184 to the system, thereby restoring each of their 100 MW loads to the system (i.e., 200 MW total), bringing the total load of the system to 400 MW.

According to various embodiments, either the processor 130 or the runback controller 140 or the shedding/restoration controller 150 may group generators 161-164 and/or loads 181-184 into sets or groups, such that one or more groups can be selected for runback or shedding or restorations while one or more other groups maintain present operation (e.g., status quo operation) to be available for future runback or shedding or restoration requests. Also, the processor 130 or the shedding/restoration controller 150 may select generators 161-164 according to an optimal selection process such that the amount of power that is shed or restored approximates the requested shedding or restoration amount.

Figure 2:
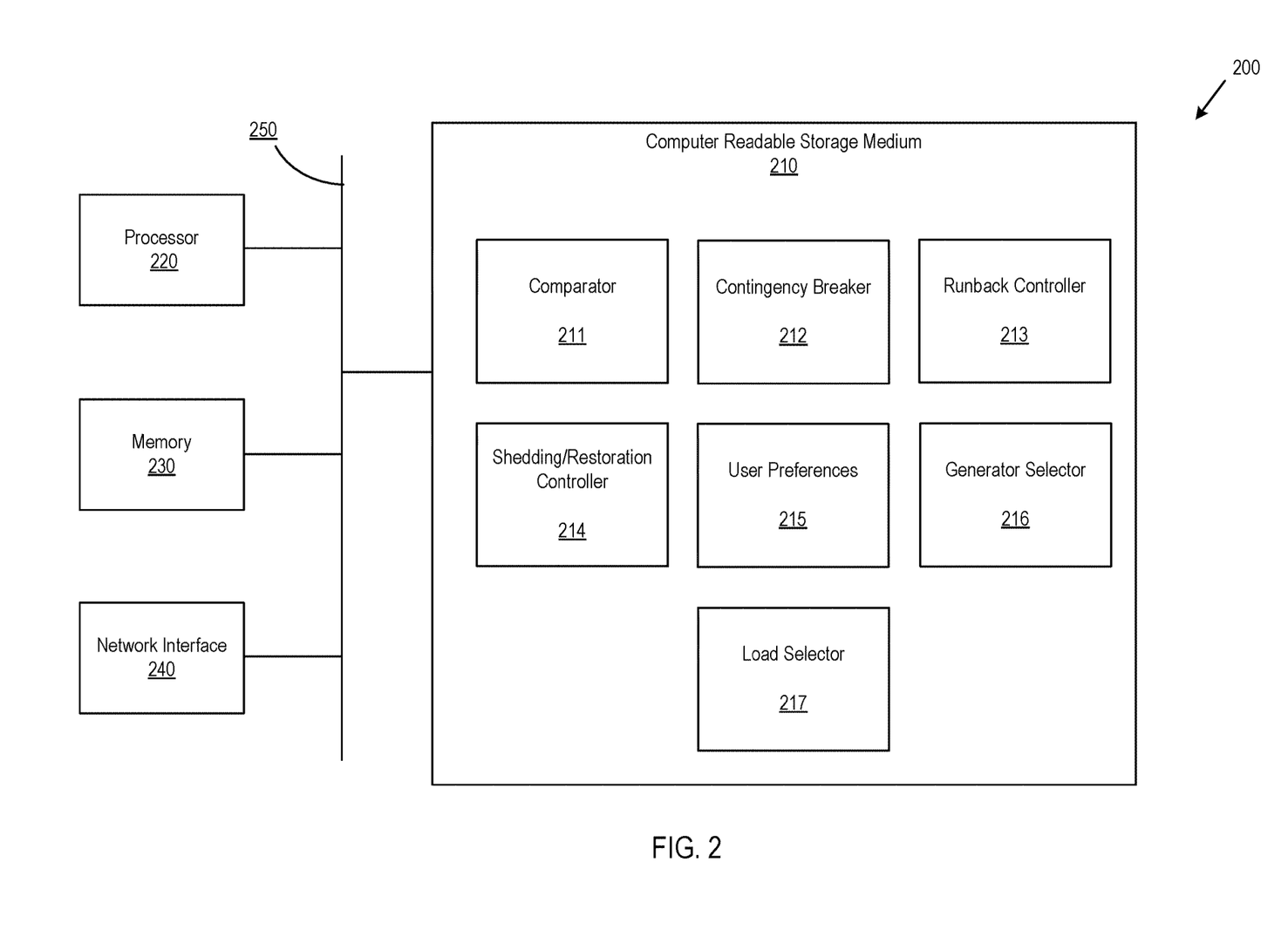
FIG. 2 is a functional block diagram of a system for load management, according to some embodiments of the present disclosure.

FIG. 2 illustrates a functional block diagram of a system to manage power reduction in a power system, according to one embodiment. The system may comprise an IED or other computing device, and more specifically a power controller 200 to manage power in a power system. FIG. 2 illustrates components of the power controller 200 that may be used to implement a process for adjusting the EG in a power system or accounting for a lack of generation in the system. In a power system (such as the power system 100 of FIG. 1), balancing generated power with a load threshold or load demand is desirable in order to avoid disruptions in delivery of power. It is therefore desirable to decrease the generated power or add load if the generated power is greater than the load threshold (i.e. if the EG is sufficiently large), or increase power or remove load if the generated power is less than the load threshold. The power controller 200 may interface with generators and/or breakers to balance the load of an electrical system with available generation of the electrical system. The power controller 200 may also group generators into sets or groups, such that one or more groups can be selected by the power controller 200 for runback while one or more other groups maintain present operation (e.g., status quo operation) to be available for future runback requests.

Referring to FIG. 2, the power controller 200 may include a computer-readable storage medium 210, a processor 220, memory 230, a network interface 240, and a bus 250 to interconnect the components. In various embodiments, the processor 220 may perform tasks such as computing, compiling, and/or executing computer executable instructions. The network interface 240 may communicate with various breakers, generators, loads, human readable interfaces, utility power lines, power sensors, and/or external or internal processors or IEDs.

The memory 230 and/or the computer-readable storage medium 210 may be any piece of hardware capable of storing information such as data, computer programs, and/or other suitable information. The memory 230 may include volatile memory and/or non-volatile memory, and may be fixed or removable. The memory 230 may include RAM, ROM, a hard drive, a flash memory, a thumb drive, an optical disk, a magnetic tape, or some combination of the above. In one embodiment, the memory 230 may be used to store instructions to be executed by the processor 220.

The computer-readable storage medium 210 may be a non-transitory memory device, according to one embodiment, and may include any number of modules (e.g., 211-217 described below) for performing tasks to control or manage generator power and/or load(s). In some embodiments, one or more of the modules may be implemented in hardware, firmware, and/or software. In some embodiments, one or more of the modules may be implemented in a cloud-based or remote location and interface via a network interface, such as the network interface 240 of the power controller 200.

The computer-readable storage medium 210 may comprise various modules, including a comparator 211, a contingency breaker 212, a runback controller 213, a shedding/restoration controller 214, a generator selector 216, and/or a load selector 217. According to various embodiments, the contingency breaker 212 may be a command or series of commands to the processor 220 to perform computations from the generator selector 216 and/or load selector 217 and/or the runback controller 213 and shedding/restoration controller 214. The computer-readable storage medium 210 may also include user preferences 215 and other data, which may be used and/or generated by the various modules.

In one embodiment, the comparator 211 may receive and compare the generator output and load threshold. If the generator output is lower than the load threshold, the comparator 211 may send a first signal to the contingency breaker 212. Alternatively, if the generator output is greater than the load threshold, the comparator 211 may send a second signal to the contingency breaker 212. If the contingency breaker 212 receives the second signal from the comparator 211, it may trip based on user preferences 215 among other factors. The user preferences 215 may include pre-determined criteria specifying conditions for when the contingency breaker 212 should trip. When tripped, the contingency breaker 212 may output commands or signals to one or more of the load selector 217, the generator selector 216, the runback controller 213, and/or the shedding/restoration controller 214. Alternatively, if the contingency breaker 212 receives the first signal from the comparator 211, it may ignore the generator selector 216 and/or load selector 217 and/or the runback controller 213 and/or shedding/restoration controller 214. In various embodiments, the first signal from the comparator 211 may be a null signal or an absence of a signal.

In another embodiment, the computer-readable storage medium 210 may not include a contingency breaker 212. The comparator 211 may receive and compare the generator output and load threshold, and output a signal or a command directly to the processor 220. For example, if the generator output is lower than the load threshold, the comparator 211 may output a command to the processor 220 to perform computations of the load selector 217 and/or shedding/restoration controller 214 to select one or more loads for shedding and perform shedding of the selection load(s). Further, according to the embodiment, if the generator output is greater than the load threshold, the comparator 211 may output a command to the processor 220 to perform computations from the generator selector 216 and/or load selector 217 and/or the runback controller 213 and shedding/restoration controller 214. For example, the processor 220 may perform computations from the load selector 217 to select one or more load(s) for restoring.

In another embodiment, the comparator 211 may receive and measure the difference between the generator output and load threshold to obtain the GLB. According to the embodiment, the comparator 211 may then pass the GLB to the contingency breaker 212, and the contingency breaker 212 may determine whether to send commands to the processor 220 to perform computations from the generator selector 216 and/or load selector 217 and/or the runback controller 213 and shedding/restoration controller 214. The contingency breaker 212 may compare the GLB from the comparator 211 against a user-defined constant or error tolerance threshold and thereby determine whether to send commands to the processor 220 or remain idle. In one embodiment, the contingency breaker 212 receives the user-defined constant or error tolerance threshold from the user preferences 215.

The generator selector 216 may determine how the power controller 200 controls or otherwise manages external generators and/or external generator breakers to reduce generator power. Specifically, the generator selector 216 may determine whether to reduce generator power by shedding generators, by running back generators, or by a combination of the two, and also how much generated power to shed and/or runback. Further, according to one embodiment, the generator selector 216 may group generators into sets or groups, such that one or more groups can be selected for runback while one or more other groups maintain present operation (e.g., status quo operation) to be available for future runback requests. The generator selector 216 may further select generators for shedding according to an optimal selection process such that the amount of power that is shed approximates the requested shedding amount. In various embodiments, the generator selector 216 may send commands to the runback controller 213 and/or the shedding/restoration controller 214 for implementation. The runback controller 213 may then prepare appropriate signals to communicate with and control external generators or generator-specific hardware or software. Also, the shedding/restoration controller 214 may then prepare appropriate signals to communicate with and control external breakers.

In one embodiment, the generator selector 216 determines whether to runback, shed generators, perform a combination of runback and shedding and/or shed or close loads. The generator selector 216 may further determine how much power to shed and/or runback. The runback controller 213 determines the groups or sets of generators for runback, such that one or more groups can be selected for runback while one or more other groups maintain present operation to be available for future runback requests. The runback controller 213 may also determine how much each generator in an active group or set is to be runback. The shedding/restoration controller 214 may determine a group of generators to shed according to an optimal selection process. The runback controller 213 may also prepare appropriate signals to communicate with and control external generators or generator-specific hardware or software. The shedding/restoration controller 214 may also prepare appropriate signals to communicate with and control external breakers.

In some embodiments, the load selector 217 may determine how the power controller 200 controls or otherwise manages load(s) and/or breakers connected to load(s) to shed and/or restore load(s). Specifically, the load selector 217 may determine whether to reduce load on the system by selecting one or more loads for shedding, whether to add load onto the system be selecting one or more loads for restoration, and also how much load power to shed and/or restore. Further, according to one embodiment, the load selector 217 may group load(s) into sets or groups, such that one or more groups can be selected for shedding while one or more other groups maintain present operation (e.g., status quo operation) to be available for future shedding requests. In another example, one or more groups can be selected for shedding while one or more other groups can be selected for restoring. The load selector 217 may further select loads for shedding and/or restoring according to an optimal selection process such that the amount of power that is shed or restored approximates the requested shedding or restoring amount. In various embodiments, the load selector 217 may send commands to the shedding/restoration controller 214 for implementation. The shedding/restoration controller 214 may prepare appropriate signals to communicate with and control external breakers according to the selected load(s) for shedding and/or restoring indicated by load selector 217. Also, the shedding/restoration controller 214 may determine a group of load(s) to shed and/or restore according to an optimal selection process. In one embodiment, the load selector 217 determines whether to shed load(s), restore load(s), or perform a combination of shedding and restoring. The load selector 217 may further determine how much power to shed and/or restore.

In various embodiments, the generator selector 216, load selector 217, the runback controller 213, and/or the shedding/restoration controller 214 may receive and/or utilize data from the user preferences 215. The user preferences 215 may include data pertinent to the selection of external generator(s) for shedding or runback and/or load(s) for shedding and/or restoring. In one embodiment, the user preferences 215 may include a list of one or more loads for shedding and/or restoring, including a priority for shedding and/or restoring. In one embodiment, the user preferences 215 may include a list of one or more loads that are not allowed to be shed or are not allowed to be restored. The non-allowance for shedding and/or restoring for the load(s) may be set for a predetermined time period and automatically removed after expiration of the time period, or set indefinitely until the load(s) are removed from the list. For example, in one embodiment the user preferences 215 may include a list of generators that do not have a capability to be runback. For example, the generators that belong to the list of the user preferences 215 would not be considered for runback. In another embodiment, the user preferences 215 may include a list of generators that are deemed preferably unavailable from shedding by the user. According to the embodiment, the generators that belong to the list of the user preferences 215 would not be considered for shedding. In other embodiments, the user preferences 215 may specify weightings, scores, or the like for generator shedding, load shedding, load restoring, and/or runback. The user preferences 215 may also specify conditions for a fault, such as for tripping the contingency breaker 212. For example, the user preferences 215 may specify a magnitude of GLB at which a fault is found. As another example, the user preferences 215 may specify a differential between GLB and DRM and/or DB at which a fault is determined present.

In some embodiments, if a system or power grid, such as a microgrid, only has battery storage, once islanded from an overall grid, the microgrid determines a user settable parameter (e.g., user settable time threshold). In some embodiments, the microgrid can plan to provide power for one or more essential loads based on priority by shedding one or more loads if state of charge (SOC) of the battery storage is less than a calculated need for the user settable time threshold, using logic shown in FIG. 3. In some embodiments, the microgrid can plan to provide power for one or more essential loads based on priority by closing loads if the SOC of the battery storage is more than a calculated need for the user settable time threshold, using logic shown in FIG. 4. In some embodiments, if further assets (e.g., battery storage, generators, loads, etc.) are added to the system, they will be optimized based on the available resource within the regulation limits. For example, if photovoltaic (PV) capability and/or wind energy capability is included in the microgrid, the included capability/capabilities may be optimized or maximized while utilizing battery energy storage system(s) as described and using the algorithms indicated by logic in FIGS. 3-5 and described herein. For example if a generator or fuel cell(s) are included in the microgrid, output by the microgrid may be adjusted to perform at a peak efficiency. In some embodiments, available generation capability based on the fuel availability (e.g., in kWh) and generator rating can be used in the same logic shown in FIGS. 3-5 for load management.

Figure 3:
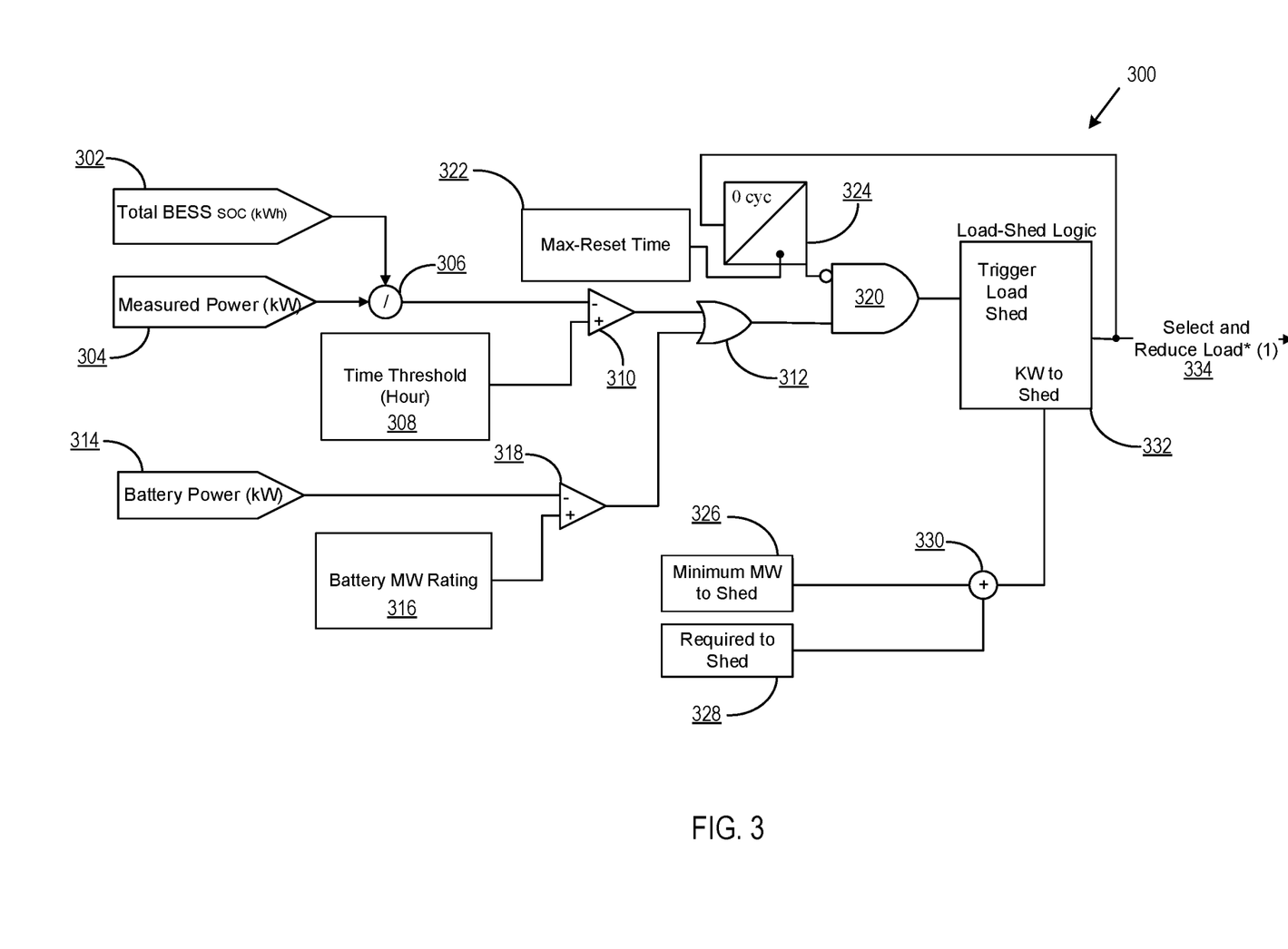
FIG. 3 shows a logic diagram for load shedding according to some embodiments of the present disclosure.

FIG. 3 shows logic 300 according to some embodiments of the disclosure that is used by or embodied in an IED (e.g., IED 102) for load shedding. Total battery energy storage system (BESS) state of charge (SOC) 302 for a system (e.g., for a microgrid) in kilowatt hours (kWh) is divided by measured power 304 for the system in kilowatts (kW), where the dividing is performed by divider logic 306. The measured power 304 reflects energy currently being consumed by the system. The output of the division, in units of hours (e.g., the result of dividing kWh/kW), is input into the negative terminal of comparator 310. The positive terminal of comparator 310 receives a time threshold 308. In some embodiments, the time threshold 308 is user entered and/or user settable. In some embodiments, the time threshold 308 is in hours units. In some embodiments, the time threshold 308 defines a time period of power demand in a microgrid. The ratio between the total BESS SOC 302 and measured power 304, provided by the output of divider logic 306, sets a minimum threshold that the time threshold 308 has to be above. The output of comparator 310 is logic 1 if the time threshold 308 is greater than the output of divider logic 306. The output of comparator 310 is logic 0 if the time threshold 308 is less than the output of divider logic 306. The output of comparator 310 is input into OR gate 312.

Battery power 314 in kW is input into the negative terminal of comparator 318. Battery MW rating 316 is input into the positive terminal of comparator 318. Battery MW rating 316 is user settable. The output of comparator 318 is logic 1 if the battery MW rating 316 is greater than the battery power 314. The output of comparator 318 is logic 0 if the battery MW rating 316 is less than the battery power 314. The output of comparator 318 is input into OR gate 312.

As noted, OR gate 312 receives the output of comparator 310 and the output of comparator 318. The output of OR gate 312 is logic 1 when one or more of the output of comparator 310 and the output of comparator 318 are logic 1. The output of comparator 310 is logic 1 when the battery will become depleted before the time threshold. This is evaluated by looking at the present state of charge and current power output of the battery. In this case load shedding is required to prevent the battery from depleting before the specified time threshold has elapsed. The output of comparator 318 is 1 when the battery discharge exceeds limit from battery or as a setpoint from the HMI—in this case load shedding is required to reduce battery discharge. If both of the output of comparator 310 and the output of comparator 318 are logic 0, the output of OR gate 312 is logic 0.

A reset interval timer 324 receives a maximum reset time 322 as well as a periodic feedback signal from the output of load-shed logic 332. In some embodiments, maximum reset time 322 is user entered and/or is user settable. Maximum reset time 322 indicates how often a load should be tripped (e.g., periodically). Reset interval timer 324 controls the time before load shedding can occur again. Load shed logic 332 indicates a load shed operation has occurred, which then triggers the reset interval timer 324. As indicated, the reset interval timer 324 persists for a length of time as defined by the maximum reset time 322, which must elapse before a subsequent load shedding can action occur. This reset interval timer 324 limits the rate at which load shed and restore actions are taken.

The output of OR gate 312 is input into AND gate 320. The output of item 324 is inverted and also input into AND gate 320. The output of AND gate 320 is logic 1 when the inverted output from item 324 and the output of OR gate 312 are both logic 1. Otherwise, if one or both of the inverted output from item 324 or the output of OR gate 312 are logic 0, the output of AND gate 320 is logic 0. The output of AND gate 320 is input into load shed logic. When the output of AND gate 320 is logic 1, a load shed is triggered by load shed logic 332. When the output of AND gate 320 is logic 0, a load shed is not triggered by load shed logic 332.

A minimum MW to shed 326, which is user settable, and a required to shed 328 amount are added by adder 330. The minimum MW to shed 326 indicates the minimum amount of load that is to be shed by the system. Minimum MW to shed 326 may be set to zero if no minimum amount for shedding is needed. The output of adder 330 is input into load shed logic 332 as the KW to shed. Load shed logic 332, upon a triggered load shed and a received KW to shed, provides an output 334 that triggers selection of a load(s) for shedding and shedding of the selected load(s), reducing the overall load on the system (e.g., a micro grid). The output 334 may be an analog output.

In some embodiments, the load shedding of FIG. 3 provides an output 334 of load shed logic 332 that triggers tripping of one or more circuit breakers or reclosers (e.g., one or more of breakers 171-174) to break a connection to a load (e.g., one or more of loads 181-184). In some embodiments, the output 334 of load shed logic 332 adjusts an output of power adjusting equipment (e.g., a variable frequency drive) to reduce the consumption by one or more loads in the system rather than completely breaking a connection to one or more loads (or completely turning the one or more loads off) (e.g., by slowing down a drive). For example, in some embodiments, the output 334 of load shed logic 332 adjusts a setpoint of a heating, ventilation, and air conditioning (HVAC) system load to adjust power consumption by the HVAC system rather than completely turning the HVAC system off. For example, the adjustment can be seasonal based on one or more of ambient temperature in an environment and time of day. For example, an empty office space or classroom need not be cooled or heated to a comfortable level when not occupied, so an HVAC system for such environments may have power consumption reduced by the output 334 of load shed logic 332 (but the system is not turned off completely) by adjusting a setpoint. The HVAC system therefore has its load on the microgrid reduced, but is still online in case the environment is to be occupied and the HVAC system must have its power consumption increased to provide cooling or heating to a conformable level in the environment. The slowing down of drives and/or setpoint adjustment allows for smoother control when distributed energy resources (DERs) can handle transients allowing for finer control for equipment and better system performance eliminating outages.

Figure 4:
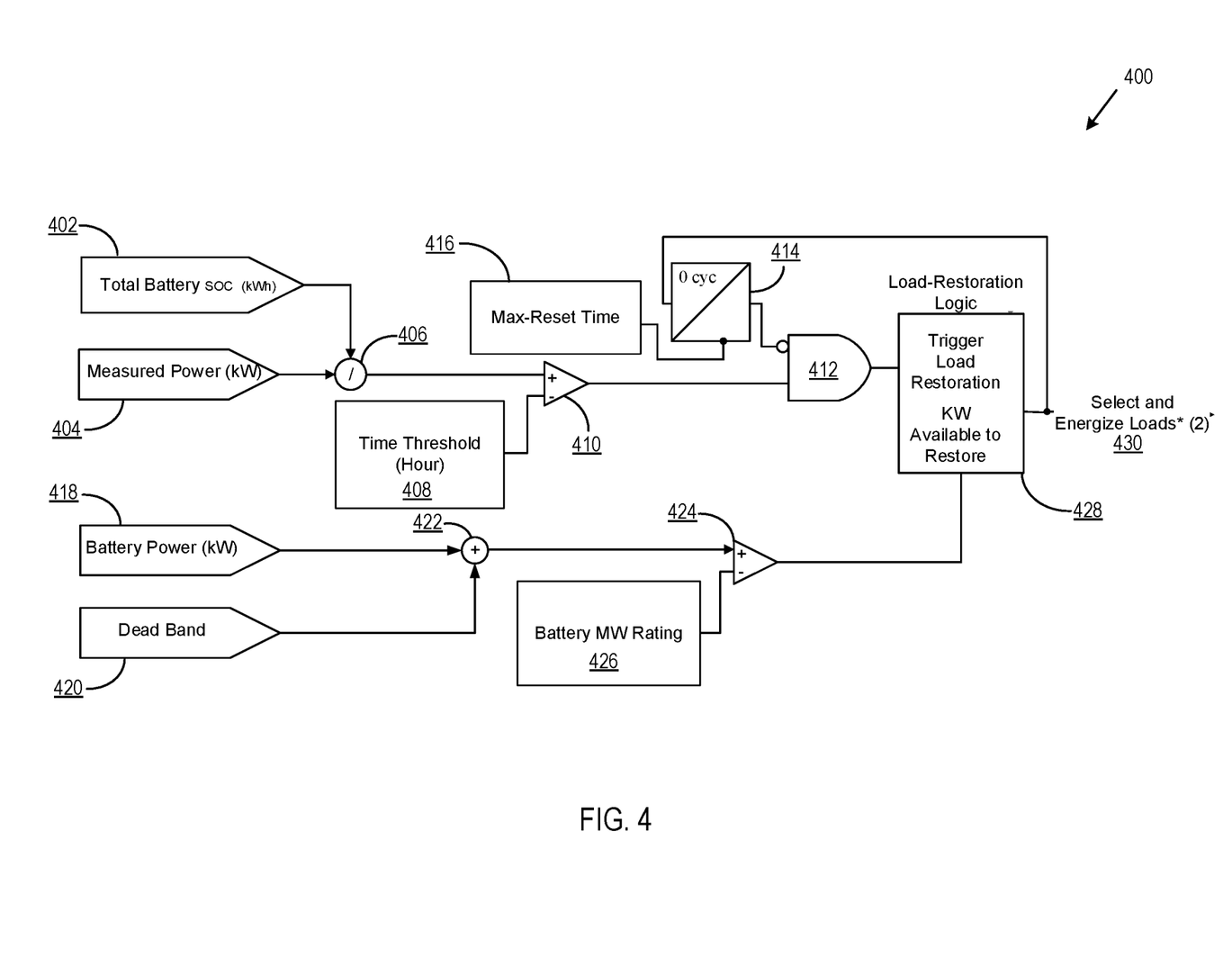
FIG. 4 shows a logic diagram for load restoration according to some embodiments of the present disclosure.

FIG. 4 shows logic 400 that is used by an IED (e.g., IED 102) for load restoration, according to some embodiments of the disclosure. For example, load restoration may occur when there is an excess battery SOC in a system, providing excess capacity than is currently needed. Total battery energy storage system (BESS) state of charge (SOC) 402 for a system (e.g., for a microgrid) in kilowatt hours (kWh) is divided by measured power 404 for the system in kilowatts (kW), where the dividing is performed by divider logic 406. The measured power 404 reflects energy currently being consumed by the system. The output of the division, in units of hours (e.g., the result of dividing kWh/kW), is input into the positive terminal of comparator 410. The negative terminal of comparator 410 receives a time threshold 408. In some embodiments, the time threshold 408 is user entered and/or user settable. In some embodiments, the time threshold 408 is in hours units. The time threshold 408 is user settable. The time threshold 408 sets a minimum threshold that the ratio between the total BESS SOC 402 and measured power 404, provided by the output of divider logic 406, has to be above. The output of comparator 410 is logic 1 if the output of divider logic 406 is greater than the time threshold 408. The output of comparator 410 is logic 0 if the output of divider logic 406 is less than the time threshold 408. The output of comparator 410 is input into AND gate 412.

A maximum reset time 416 is input into pick up and drop out timer 414. In some embodiments, the maximum reset time 416 is user entered and/or user settable. The maximum reset time 416 indicates how often a load should be tripped (e.g., periodically). The pick up and drop out timer 414 also receives a periodic feedback signal from the output of load restoration logic 428. The maximum reset time 416 allows how often the load restoration action is to be performed. Some loads may take time to recover and quick successive load restoration might cause undesired response so this maximum reset time 416 allows a user to configure this timing.

The output of item 414 is inverted and input into AND gate 412. The output of comparator 410 is also input into AND gate 412. The output of AND gate 412 is logic 1 when the inverted output from item 414 and the output of comparator 410 are both logic 1. Otherwise, if one or both of the inverted output from item 414 or the output of comparator 410 are logic 0, the output of AND gate 412 is logic 0. The output of AND gate 412 is input into load restoration logic 428. When the output of AND gate 412 is logic 1, a load restoration is triggered by load restoration logic 428. When the output of AND gate 412 is logic 0, a load restoration is not triggered by load shed logic 428. Battery power 418 in kW and dead band 420 are added by adder 422. The deadband 420 is present so that there is some margin available for the BESS system especially if the loads are greater than anticipated. This dead band 420 allows some additional margin so that some reserve capacity is always available.

The output of adder 422 is input into the positive terminal of comparator 424. A battery MW rating 426 is input into the negative terminal of comparator 424. Battery MW rating 426 is user settable. The output of comparator 424 is logic 1 if the output of adder 422 is greater than the battery MW rating 426. The output of comparator 424 is logic 0 if the output of adder 422 is less than the battery MW rating 426. The output of comparator 424 is input into load restoration logic 428, alerting the logic 428 that KW is available to restore in the system.

Load restoration logic 428, upon a triggered load restoration and a triggered KW available to restore, provides an output 430 that triggers selection of a load(s) for restoration and energizing of the selected load(s) by a determined KW available to restore, restoring load in the system (e.g., a micro grid).

In some embodiments, the load restoration of FIG. 4 provides an output 430 of load restoration logic 428 that triggers closing of one or more circuit breakers or reclosers (e.g., one or more of breakers 171-174) to close a connection to a load (e.g., one or more of loads 181-184). In some embodiments, the output 430 of load restoration logic 428 adjusts an output of power adjusting equipment (e.g., a variable frequency drive) to increase the consumption by one or more loads in the system (e.g., speed up a drive). For example, in some embodiments, the output 430 of load restoration logic 428 adjusts a setpoint of a heating, ventilation, and air conditioning (HVAC) system load to adjust power consumption by the HVAC system. Like as discussed above, for example, the adjustment can be seasonal based on one or more of ambient temperature in an environment and time of day. For example, as discussed above for load shedding, an empty office space or classroom need not be cooled or heated to a comfortable level when not occupied, so an HVAC system for such environments may have power consumption reduced by the output of load shed logic 332 (but the system is not turned off completely) by adjusting a setpoint. The HVAC system therefore has its load on the microgrid reduced, but is still online in case the environment is to be occupied and the HVAC system must have its power consumption increased to provide cooling or heating to a conformable level in the environment. The output 430 of load restoration logic 428 may adjust the setpoint of the HVAC system in such a case to increase power consumption of the HVAC system and provide cooling or heating to a conformable level in the environment. The drive adjustment and/or setpoint adjustment allows for smoother control when distributed energy resources (DERs) can handle transients allowing for finer control for equipment and better system performance eliminating outages.

In some embodiments, the logic 300 and logic 400 of FIGS. 3 and 4 are combinable to form a combined load shedding and load restoration logic. In some embodiments, the time threshold 308 and the time threshold 408 are the same value.

Figure 5:
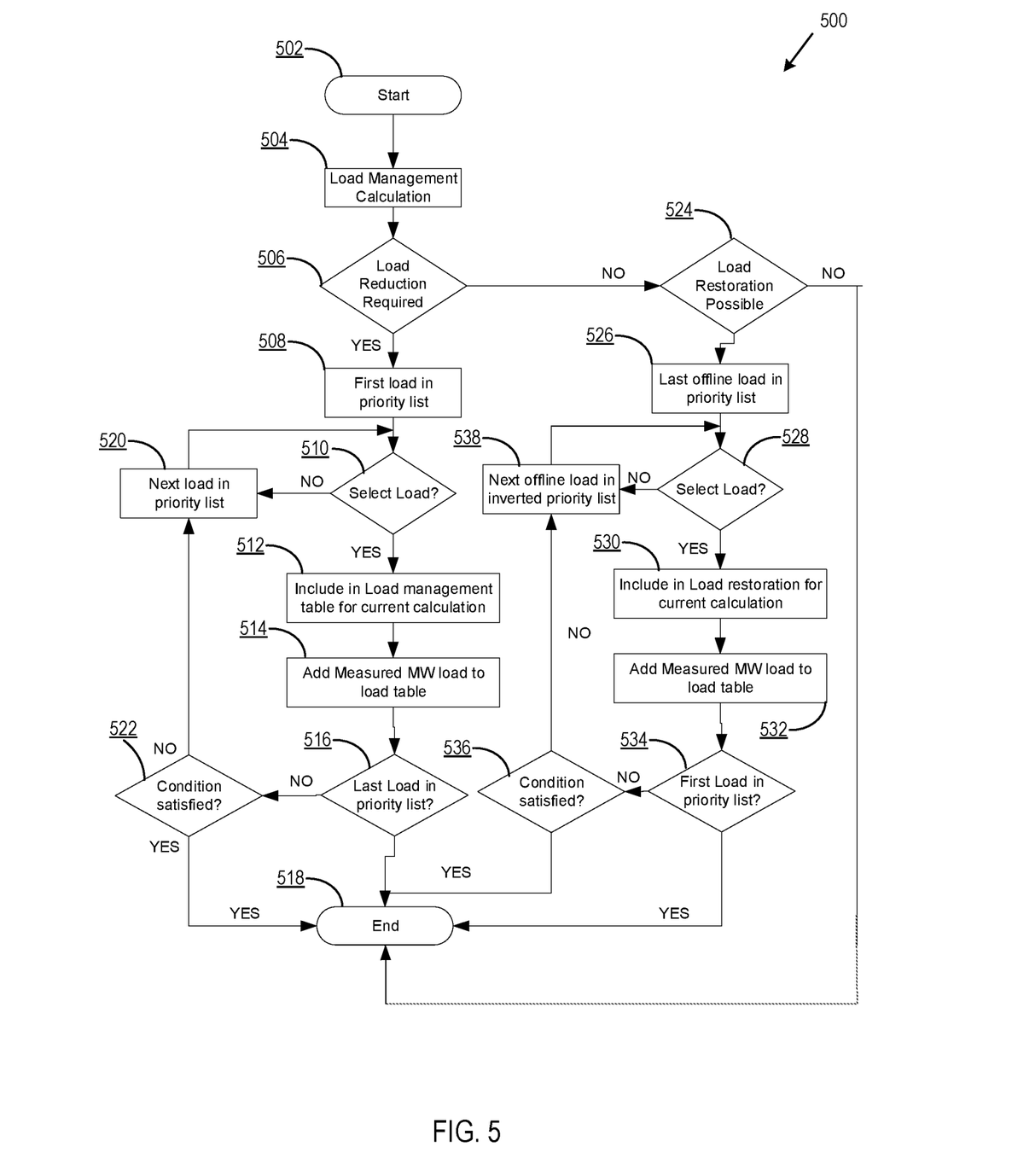
FIG. 5 shows a process for selecting a load for load shedding and/or load restoration according to some embodiments of the present disclosure.

FIG. 5 shows a load selection process 500 in accordance with some embodiments. Process 500 shows how one or more loads are selected for shedding or restoration using the load shedding and load restoration logic of FIGS. 3 and 4. For example, process 500 may implement selection and shedding of a load when load shed logic 332 outputs the output 334. For example, process 500 may implement selection and energizing (restoration) of a load when load restoration logic 428 outputs the output 430.

Process 500 starts at block 502 and a load management calculation is performed at block 504. In some embodiments, the load management calculation at block 504 includes executing the logic 300 for load shedding and/or the logic 400 for load restoration shown in FIGS. 3 and 4 to determine whether load shedding or load restoration is needed for a system (e.g., microgrid, power grid, etc.). For example, at block 504, a determination may be made regarding whether logic 300 produces an output 334 directing selection and shedding of one or more loads, and/or a determination may be made regarding whether logic 400 produces an output 430 directing selection and energizing (restoring) of one or more loads.

At block 506, a determination is made regarding whether lead reduction (load shedding) is required. The determination at block 506 may use the load management calculation at block 504. If load reduction is required at block 506, a first load in a priority list of one or more loads is determined at block 508, and a determination is made whether to select the first load of the list for shedding at block 510. If the first load of the list is determined not to be selected, the next load in the priority list is determined at 520 and process 500 returns to block 510, where a determination is made as to whether this next load is to be selected for shedding. If the determination at 510 is again no, process 500 moves to block 520 to determine the next load in the priority list. If the determination at block 510 is made that a load from the priority list (the first load, a next priority load, etc.) is to be selected for shedding, process 500 moves to block 512, where the selected load is included in a load management table for a current load calculation and shedded from the system (e.g., microgrid). By shedding the selected load, a measured power consumption of the selected load is removed from an overall power consumption of the system. It should be noted that the selection of a load from the priority list can be according to a forward order of the list (e.g., descending priority), a reverse order of the list (e.g., ascending priority), randomly from the list, or using any other selection method for selecting a load from the priority list.

At block 514, the selected load has its current consumption measured (e.g., in MW), which is added to a load table. At block 516, a determination is made as to whether the shedded load is the last load of the priority list of loads. If the shedded load is the last load of the list, the load shedding of process 500 ends at block 518. Otherwise, if the shedded load is not the last load in the priority list of loads, process 500 continues to block 522, where a determination is made as to whether enough loads have been shedded to meet a load shedding condition indicating how much load must be shed for the system that is set, for example, by the output 334. If the condition of block 522 is satisfied, where enough load(s) have been shed from the system, the load shedding of process 500 ends at block 518. If the condition of block 522 is not satisfied, where not enough load(s) have been shed from the system, the load shedding of process 500 continues to block 520, where a next load of the priority list is determined.

Back to block 506, if load reduction is not required, process 500 moves to block 524 where a determination is made as to whether load restoration is possible. The determination of block 524 may use the load management calculation at block 504. If it is determined at block 524 that load restoration is not possible, process 500 ends at block 518. If it is determined at block 524 that load restoration is possible, process 500 continues to block 526, where a last offline load in a priority list of one or more loads is determined, and a determination is made whether to select the determined last offline load block 528. If the last load of the list is determined not to be selected, the next to last offline load in the priority list is determined at 538 and process 500 returns to block 528, where a determination is made as to whether this next load is to be selected for restoration. If the determination at 528 is again no, process 500 moves to block 538 to determine the next offline load in the priority list, moving from last to first. If the determination at block 528 is made that a load from the priority list (the last offline load, a next to last offline load, next-next to last offline load, etc.) is to be selected for load restoration, process 500 moves to block 530, where the selected load is included in a load restoration for current for a current load calculation and restored to the system (e.g., microgrid). It should be noted that the selection of a load from the priority list can be according to a reverse or inverted order of the list (e.g., ascending priority), a forward order of the list (e.g., descending priority), randomly from the list, or using any other selection method for selecting a load from the priority list.

At block 532, the selected load has its current consumption measured (e.g., in MW), which is added to a load table. At block 534, a determination is made as to whether the restored load is the first load of the priority list of loads. If the restored load is the first load of the list, the load restoration of process 500 ends at block 518. Otherwise, if the restored load is not the first load in the priority list of loads, process 500 continues to block 536, where a determination is made as to whether enough loads have been restored to meet a load restoration condition indicating how much load must be restored for the system that is set, for example, by the output 430. If the condition of block 536 is satisfied, where enough load(s) have been restored from the system, the load restoration of process 500 ends at block 518. If the condition of block 536 is not satisfied, where not enough load(s) have been restored for the system, the load restoring of process 500 continues to block 538, where a next offline load of the priority list (e.g., inverted priority list) is determined.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified and/or steps or actions may be omitted.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer executable code located within a memory device and/or transmitted as transitory or non-transitory electronic signals over a system bus or wired or wireless network.

Several aspects of the embodiments disclosed herein may be illustrated and/or implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure includes all permutations and combinations of the independent claims with their dependent claims.

It will be obvious to those having skill in the art that many changes may be made to the details of the above-described embodiments without departing from the underlying principles of the disclosure. The scope of the present disclosure should, therefore, be determined only by the following claims.

The invention claimed is:

1. A system for load management in a microgrid, comprising:
   one or more processors configured to:
      receive a time threshold value, where the time threshold value is user settable and defines a time period of power demand in a microgrid;
      determine a battery rating of the microgrid;
      trigger load shedding in the microgrid based on one or more of the time threshold value and the battery rating, wherein the load shedding includes:
         selecting a first load in the microgrid for load shedding; and
         shedding the selected first load, wherein a measured power consumption of the selected first load is removed from an overall power consumption of the microgrid by the shedding.

2. The system of claim 1, wherein the time threshold value is user-entered.

3. The system of claim 1, wherein the one or more processors are further configured to:
   determine a total battery energy storage system (BESS) state of charge (SOC) of the microgrid;
   determine a measured power of the microgrid;
   determine a ratio between the total BESS SOC and the measured power of the microgrid; and
   compare the time threshold value to the ratio.

4. The system of claim 3, wherein the one or more processors are further configured to:
   determine that the time threshold value is greater than the ratio via the comparing of the time threshold value to the ratio; and
   trigger load shedding in the microgrid based on the time threshold value.

5. The system of claim 3, wherein the one or more processors are further configured to:
   determine that the time threshold value is less than the ratio via the comparing of the time threshold value to the ratio; and
   trigger load restoration in the microgrid based on the ratio.

6. The system of claim 5, wherein the load restoration includes:
   selecting a second load in the microgrid from a priority list for load restoration; and
   restoring the selected second load, wherein a measured power consumption of the selected second load is added to the overall power consumption of the microgrid by the restoring.

7. The system of claim 1, wherein the one or more processors are further configured to:

determine a battery power of the microgrid;
determine a battery rating;
compare the battery power to the battery rating;
determine that the battery rating is greater than the battery power of the microgrid via the comparing of the battery power to the battery rating; and
trigger load shedding in the microgrid based on the battery rating.

8. The system of claim 1, wherein the one or more processors are further configured to:
determine a minimum power consumption for shedding from the microgrid;
determine a required power consumption for shedding from the microgrid; and
determine an amount of power consumption for shedding from the microgrid by adding the minimum power consumption to the required power consumption.

9. The system of claim 8, wherein the measured power consumption of the selected first load that is removed from the overall power consumption of the microgrid by the shedding equals the amount of power consumption for shedding from the microgrid.

10. The system of claim 8, wherein the measured power consumption of the selected first load that is removed from the overall power consumption of the microgrid by the shedding does not equal the amount of power consumption for shedding from the microgrid.

11. The system of claim 10, wherein the load shedding further includes:
selecting a second load in the microgrid from a priority list for shedding, the second load different to the first load; and
shedding the selected second load, wherein a measured power consumption of the selected second load is removed from the overall power consumption of the microgrid by the shedding of the selected second load.

12. The system of claim 11, wherein the measured power consumption of the selected first load and the selected second load that are removed from the overall power consumption of the microgrid equals the amount of power consumption for shedding from the microgrid.

13. The system of claim 11, wherein the measured power consumption of the selected first load and the selected second load that are removed from the overall power consumption of the microgrid does not equal the amount of power consumption for shedding from the microgrid.

14. The system of claim 1, wherein selecting a first load in the microgrid for shedding comprises selecting the first load from a priority list.

15. A system for load management in a microgrid, comprising:
one or more processors configured to:
receive a time threshold value, where the time threshold value is user settable and defines a time period of power demand in a microgrid;
determine a battery rating of the microgrid;
determine a total battery energy storage system (BESS) state of charge (SOC) of the microgrid;
determine a measured power of the microgrid;
determine a ratio between the total BESS SOC and the measured power of the microgrid;
compare the time threshold value to the ratio;
trigger load shedding in the microgrid based on one or more of the comparison and the battery rating, wherein the load shedding includes:
selecting a first load in the microgrid for load shedding; and
shedding the selected first load, wherein a measured power consumption of the selected first load is removed from an overall power consumption of the microgrid by the shedding.

16. The system of claim 15, wherein the one or more processors are further configured to:
determine that the time threshold value is greater than the ratio via the comparing of the time threshold value to the ratio; and
trigger load shedding in the microgrid based on the time threshold value.

17. The system of claim 15, wherein the one or more processors are further configured to:
determine that the time threshold value is less than the ratio via the comparing of the time threshold value to the ratio; and
trigger load restoration in the microgrid based on the ratio.

18. A system for load management in a microgrid, comprising:
one or more processors configured to:
receive a time threshold value, where the time threshold value is user settable and defines a time period of power demand in a microgrid;
determine a battery rating of the microgrid;
determine a minimum power consumption for shedding from the microgrid;
determine a required power consumption for shedding from the microgrid;
determine an amount of power consumption for shedding from the microgrid by adding the minimum power consumption to the required power consumption;
trigger load shedding in the microgrid based on one or more of the time threshold value and the battery rating, wherein the load shedding includes:
selecting a first load in the microgrid for load shedding; and
shedding the selected first load, wherein a measured power consumption of the selected first load is removed from an overall power consumption of the microgrid by the shedding.

19. The system of claim 18, wherein the measured power consumption of the selected first load that is removed from the overall power consumption of the microgrid by the shedding equals the amount of power consumption for shedding from the microgrid.

20. The system of claim 18, wherein the measured power consumption of the selected first load that is removed from the overall power consumption of the microgrid by the shedding does not equal the amount of power consumption for shedding from the microgrid.

* * * * *